June 9, 1942.  E. M. WAYLAND  2,285,955

FRUIT SIZING AND GRADING MACHINE

Filed Dec. 7, 1939

Inventor

E. M. Wayland,

Attorneys

Patented June 9, 1942

2,285,955

UNITED STATES PATENT OFFICE 2,285,955

FRUIT SIZING AND GRADING MACHINE

Edwin M. Wayland, Covesville, Va.

Application December 7, 1939, Serial No. 308,073

6 Claims. (Cl. 209—91)

The present invention relates to improvements in fruit sizing and grading machines of the type employing ejector means for ejecting the fruit from the machine, and more particularly aims to improve such machines and ejector means therefor.

Fruit sizing and grading machines of the above referred to type commonly are provided with an elongated support with means for moving the fruit along the support, for example, travelling belts. The fruit, for example, apples, may be subjected to upedging devices to rotate the fruit on its core-axis, and thus present every diameter of the fruit which is transverse to its core-axis, to a sizing and ejector device, which may be in the form of a roll, wheel, conveyor belt or other members having a movable surface.

Such sizing and grading machines give satisfactory service when sizing and grading dry fruit, but under the more common practice of washing all fruit prior to grading, the surface of the ejector rolls becomes wet and slippery and loses its coefficient of friction, with the result that wet fruit will pile up ahead of the ejector roll, with the roll incapable of ejecting the fruit. Furthermore, certain fruit, such as Staymen Winesap apples, are exceedingly hard to size with a smooth surfaced ejector, whether dry or wet, apparently because the skin is unusually smooth and slippery and a good frictional contact with the ejector cannot be made.

My present invention aims to improve the construction of the machines and ejector means whereby wet fruit may be properly graded without bruising.

As illustrative of my invention, I have selected for illustration a form of the invention designed as an improvement upon my prior Patent No. 1,925,158, granted September 5, 1933, which has given highly satisfactory results, although it is to be understood that the invention is not restricted to the illustrated form of sizing machine, upedging means or ejecting means.

Figure 1:
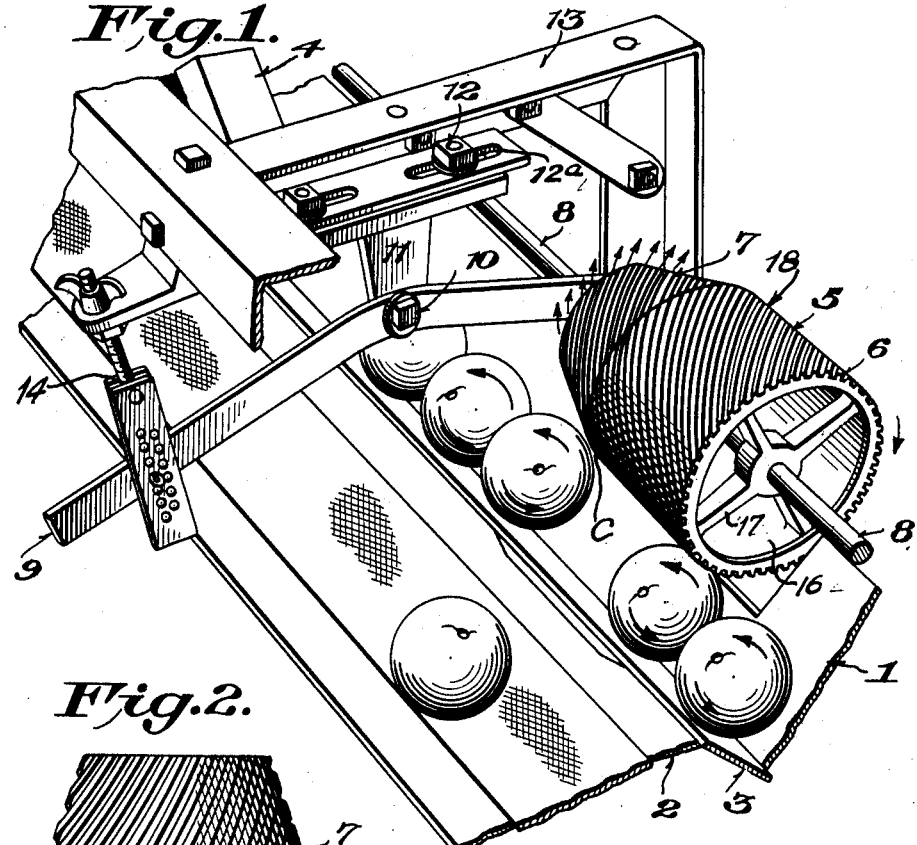
Fig. 1 is a perspective view of a portion of a fruit sizing and grading machine embodying my invention.
Figure 2:
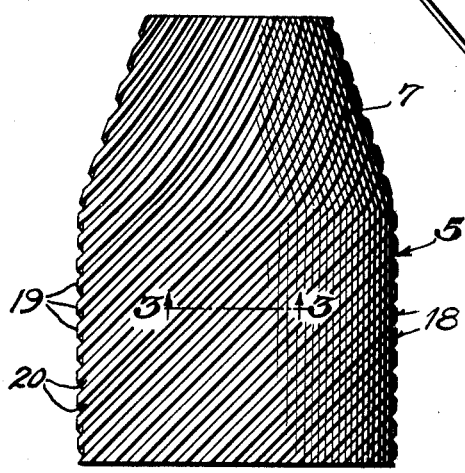
Fig. 2 is a plan view of one embodiment of the improved ejector roll according to the invention.

Referring to the drawing, the sizing and grading machine may conveniently be of the general type shown in my prior Patent No. 1,925,158, above referred to, employing a trough 1, a distributing board 2, and a horizontally travelling belt 3 moving in the trough. In the case of sizing apples, the trough may be V-shaped, and the belt 3 preferably lies upon one face thereof for supporting and moving the apples through the trough and under an upedging device, as for example, brushes 4, for upedging the apples and rotating them on their core-axes.

An ejector roll 5 having a substantially cylindrical ejector body 6 and a forwardly tapering, anti-pinching oversize ejector 7 is mounted for rotation upon a shaft 8 journalled in the ends of levers 9 which are fulcrumed at 10 to a hanger 11 adjustably supported as by bolts 12 extending through slots 12ᵃ in a supporting part or frame 13 of the machine. The lever 9 is adjustable to vary the distance between the surface of the body portion 6 of the ejector roll and the belt 2, according to the predetermined size diameter of the fruit, as by means of an adjustable connection 14 between the frame 13 and the forward end of the lever 9. The ejector roll 5 previously was made of compressed straw with the thought of providing a good frictional surface for contact with the fruit. When grading wet fruit, however, the surface of the roll became wet and slippery so that satisfactory ejection and grading could not be obtained.

According to the present invention, the roll 5 conveniently may comprise a hollow metallic body 16 having a cylindrical portion 6 and a forwardly tapering over-size ejector portion 7 adapted to be connected to the shaft 8 by means of spiders 17.

The outer surface of the ejecting device or roll 5 is preferably of soft rubber or like moldable material and preferably is in the form of a one-piece molded jacket 18 adapted to be slipped over the body 16 of the roll 5. The jacket 18 is preferably fluted to provide spaced ribs 19 and intervening water drainage channels 20. Preferably the ribs are inclined with respect to the axis of the roll, the pitch being varied depending upon the nature of the fruit being graded. For grading apples and like fruit with a surface speed of approximately 400 feet per minute, I have found that highly satisfactory results are obtained by arranging the ribs 19 at an angle of approximately 45 degrees to the path of travel of the fruit, or as in the illustrated case, to the roll axis. It will be understood that the ribs 19 are inclined either to the right (as in Fig. 1) or to the left, depending upon whether the ejector roll is a right hand or left hand roll. Of course the ejecting surface of the roll is upwardly rotating and the rib should be inclined downwardly and rearwardly from the point of initial contact C with the fruit.

The spaced ribs and grooves 19 and 20 of the jacket preferably extend forwardly through the tapered over-size ejector surface 7, and advantageously may be curved throughout this portion of the roll, so that the grooves 20 adjacent the forward portion of the roll are inclined toward the roll axis. The grooves may taper toward the forward tapered end of the roll, i. e., decrease in width, better to conduct water collected by the roll toward the forward end from which it is discharged in a direction away from the fruit.

Figure 4:
Fig. 4 is a plan view of a portion of the ejector roll according to another form of the invention.
Figure 5:
Fig. 5 is a detail sectional view on the line 5—5 of Fig. 4.
Figure 3:
Fig. 3 is a transverse sectional view taken on the line 3—3 of Fig. 2.

Although it is preferred that the ribs 19 be continuous from end to end of the roll 5, so as to provide continuous water-conducting channels therebetween, satisfactory results may be obtained if the ribs are broken or interrupted throughout their length. For example, as shown in Figs. 4 and 5, the ribs may be formed of spaced pyramidal projections, which may be molded as an integral part of the jacket 18.

I have found that in practice, when the surface of the ejector roll is ribbed or interrupted according to the invention, a relatively dry contacting surface providing a good frictional contact with the fruit is maintained. The fruit contacting surfaces of the roll are so narrow that water does not collect upon them but quickly drains into the adjoining channel 20 to drain toward the forward or tapered end of the roll from which it is thrown by centrifugal force in a direction away from the fruit.

Obviously the invention is not to be restricted to the details of construction of the embodiments shown as these are intended merely as illustrations of the invention.

I claim:

1. In a fruit sizing machine for sizing and grading wet or slippery smooth surfaced fruit, a support, means for moving fruit along the support, a sizing and ejecting roll rotatably mounted in spaced relation to said support, said roll having a cylindrical body portion and a forwardly tapering oversize ejecting portion, the surface of said roll formed with substantially continuous inclined alternate narrow ribs and grooves, the inclination of said ribs and grooves, on at least a major portion of the tapering oversize ejecting portion with respect to the axis of said roll, being less than on the cylindrical body portion.

2. In a fruit sizing machine for sizing and grading wet or slippery smooth surfaced fruit, a support, means for moving fruit along the support, a sizing and ejector roll rotatably mounted in spaced relation to said support, said roll having a cylindrical body portion and a forwardly tapering oversize ejecting portion, the surface of said roll formed with substantially continuous inclined alternate narrow ribs and grooves, the inclination of said ribs and grooves on at least a major portion of the tapering oversize ejecting portion with respect to the axis of said roll being less than on the cylindrical body portion, and said grooves tapering in width toward the less inclined end thereof.

3. In a fruit sizing machine for sizing and grading wet or slippery smooth surfaced fruit, a trough, a conveying belt for moving fruit along said trough, a sizing and ejecting roll above said trough in predetermined spaced relation to said belt, a relatively soft molded rubber cover for said roll, the outer surface of said cover being formed with a plurality of substantially continuous narrow ribs and grooves extending angularly with reference to the roll axis from the rear and toward the front end of said roll, the angular disposition of the ribs and grooves decreasing toward the front end of said roll.

4. In a fruit sizing machine for sizing and grading wet or slippery smooth surfaced fruit, a trough, a conveyor belt for moving fruit along said trough, a sizing and ejecting device having a movable surface disposed above said trough in predetermined spaced relation to said belt, said movable surface including a plurality of substantially continuous spaced grooves inclined upwardly with respect to the path of travel of the moving fruit for collecting moisture deposited upon the surface by wet fruit, conducting it lengthwise of the surface and discharging it therefrom in a direction away from said fruit.

5. In a fruit sizing machine for sizing and grading wet or slippery smooth surfaced fruit, a trough, a conveyor belt for moving fruit along said trough, a sizing and ejecting roll above said trough in predetermined spaced relation to said belt and presenting an upwardly movable surface toward said trough, and a plurality of substantially continuous grooves regularly spaced around said roll and below the outermost surface thereof and inclined with respect to the axis of said roll for collecting moisture deposited upon the roll by wet fruit, conducting it lengthwise of the roll and discharging it therefrom in a direction away from said fruit, thereby to maintain substantially dry fruit contacting surfaces between said moisture collecting and conducting grooves.

6. A fruit sizing machine as defined in claim 1 in which the inclined ribs and grooves are formed in a soft moldable covering fitted over said roll.

EDWIN M. WAYLAND.